United States Patent [19]
Watanabe et al.

[11] Patent Number: 5,251,226
[45] Date of Patent: Oct. 5, 1993

[54] DISCHARGE EXCITING EXCIMER LASER DEVICE

[75] Inventors: Shuntaro Watanabe, Kashiwa; Yasuo Oeda, Sodegaura; Ken Ohmata, Sodegaura; Michito Uehara, Sodegaura; Mitsugu Terada, Sodegaura; Hideaki Shibata, Sodegaura; Yuichiro Terashi, Sodegaura, all of Japan

[73] Assignee: Mitsui Petrochemical Industries, Ltd., Tokyo, Japan

[21] Appl. No.: 775,937
[22] PCT Filed: Mar. 4, 1991
[86] PCT No.: PCT/JP91/00288
 § 371 Date: Nov. 4, 1991
 § 102(e) Date: Nov. 4, 1991
[87] PCT Pub. No.: WO91/14302
 PCT Pub. Date: Sep. 19, 1991

[30] Foreign Application Priority Data

Mar. 5, 1990 [JP] Japan ................................. 2-53188

[51] Int. Cl.$^5$ ............................................. H01S 3/097
[52] U.S. Cl. ........................................ 372/87; 372/57; 372/86
[58] Field of Search ....................... 372/57, 86, 87, 81, 372/83

[56] References Cited

U.S. PATENT DOCUMENTS 4,837,773  6/1989  Wakata et al. ........................ 372/86

FOREIGN PATENT DOCUMENTS 187086  7/1980  Japan .
61-91983  5/1986  Japan .
228685  9/1988  Japan .
307284  12/1989  Japan .

*Primary Examiner*—James W. Davie
*Attorney, Agent, or Firm*—Sherman & Shalloway

[57] ABSTRACT

A discharge exciting excimer laser device comprises a pair of main discharge electrodes, a dielectric and an auxiliary electrode. The dielectric is in a cylindrical form and has a side opposed to one of the main discharge electrodes, which side is formed into a flat plate-like portion. The auxiliary electrode is embraced within the dielectric leaving a space and is opposed to one of the main discharge electrodes with the flat plate-like portion of the dielectric sandwiched therebetween. Such a construction increases laser output and improves insulating performance.

6 Claims, 2 Drawing Sheets

DISCHARGE EXCITING EXCIMER LASER DEVICE

TECHNICAL FIELD

The present invention relates to a discharge exciting laser device comprising a pair of main discharge electrodes and an auxiliary electrode.

BACKGROUND TECHNIQUE

The conventional technique of this kind is disclosed in Japanese Patent Laid-Open publication No. 91982/1986. This Japanese Patent Laid-Open publication NO. 91982 discloses a discharge exciting excimer laser device in which for extending the life of laser gas, alumina ceramics inert to laser gas is used in place of quartz heretofore used to constitute a dielectric.

In the discharge exciting excimer laser device of this kind, it is necessary for increasing a laser output to activate preliminary ionization, when auxiliary discharge takes place between a main discharge electrode and an auxiliary discharge electrode, that is, photo ionization effect caused by ultraviolet luminescence from the auxiliary electrode and the supply of electron to a main discharge space.

To this end, it was necessary (1) to quicken a rise of voltage between the main discharge electrode and the auxiliary discharge electrode, (2) to increase a dielectric constant of an dielectric, (3) to reduce the sectional thickness of the dielectric, and (4) to improve a contact between the dielectric and the electrode. In addition, there was a technical problem of improving the insulating performance between the electrodes.

However, in the conventional techniques including the aforesaid publication, sufficient consideration has not been paid to the aforesaid points. Particularly, the shape of the dielectric in the aforesaid points (3) and (4) has been ignored.

More particularly, in the prior art, the dielectric to surround the auxiliary electrode was in the shape of cylinder (a round pipe) or flat plate, and the inner surface thereof in contact with the auxiliary electrode was curved, there were difficulties in that polishing work is difficult, and the operation for receiving the auxiliary electrode therein is cumbersome.

When a high voltage of the order of 30 kv was applied in order to obtain a high output, a dielectric breakdown possibly occurs in the dielectric construction having the aforementioned shape.

On the other hand, Japanese Patent Publication No. 64069/1988 discloses a discharge exciting pulse laser in which a dielectric in the form of a tube is used and a cooling medium is sealed into the tubular dielectric. The feature of this patent publication lies in that a dielectric is formed into a tubular configuration, into which is sealed a cooling medium, and nothing is described of the fact that a dielectric should be formed into a square pipe.

DISCLOSURE OF THE INVENTION

The present invention has employed the following means to increase the laser output and improve the insulating performance.

The present invention provides a discharge exciting excimer laser device comprising a pair of main discharge electrodes with a laser optical axis being in a longitudinal direction, said main discharge electrodes being arranged opposedly to each other over said laser optical axis, a dielectric arranged externally of said pair of main discharge electrodes and opposedly to one of said main discharge electrodes, and an auxiliary electrode opposed to said one of main discharge electrodes through said dielectric, said dielectric being formed into a cylindrical configuration and whose side opposed to the main discharge electrodes is in the form of a flat plate, said auxiliary electrode being embraced within the dielectric leaving a space and being opposed to said one of main discharge electrodes with said flat plate portion sandwiched therebetween.

According to the aforementioned means, said dielectric is formed into a cylindrical configuration and the side thereof opposed to the main discharge electrodes being in the form of a flat plate, and said auxiliary electrode is embraced within the dielectric leaving a space and opposed to one of the main discharge electrodes with said flat plate portion sandwiched therebetween. With this arrangement, the insulating performance can be improved.

If at least one surface of said flat plate portion is subjected to mirror surface polishing, the main discharge electrode or the auxiliary electrode can be placed in close contact with said surface. When the dielectric is configured as described above and the flat plate portion is made thin, the preliminary ionization electron density can be increased.

With respect to the extent of surface polishing, the difference of altitude in unevenness of the surface is 100 μm or less, preferably, 10 μm or less.

Furthermore, the dielectric is formed into a cylindrical configuration, particularly, a square pipe configuration comprising a flat plate portion whereby the insulating performance can be improved, and the process for receiving the auxiliary electrode can be simplified. In addition, the dielectric is constituted by a rod-like member having a ⊓-shaped section with wall portions extended from opposite sides of the flat plate portion toward one of the flat portion in the square pipe and a flat plate-like cover member for covering the open side of said ⊓-shaped rod-like member into a square pipe configuration. With this arrangement, both surfaces of the ⊓-shaped flat plate portion in contact with the electrode can be polished to increase the laser output. Moreover, the formation of the square pipe becomes easy.

As the dielectrics used in the present invention, there can be mentioned ceramics such as alumina ceramics, and inorganic materials such as quartz glass, borosilicate glass (for example, PYREX, the trade name, manufactured by Dow Corning Corp.), strontium titanate etc.

BRIEF DESCRIPTION OF THE DRAWINGS

FIG. 1 is a front sectional view showing an electrode portion of a discharge exciting excimer laser device;

FIG. 2 is a side sectional view of the same;

FIG. 3 is a front sectional view of a dielectric portion; and

FIG. 4 is a graph showing a state in which an auxiliary discharge (corona discharge) between a cathode and an auxiliary electrode.

BEST MODE FOR CARRYING OUT THE INVENTION

Embodiments of the present invention will be described hereinafter with reference to the drawings.

Figure 1:
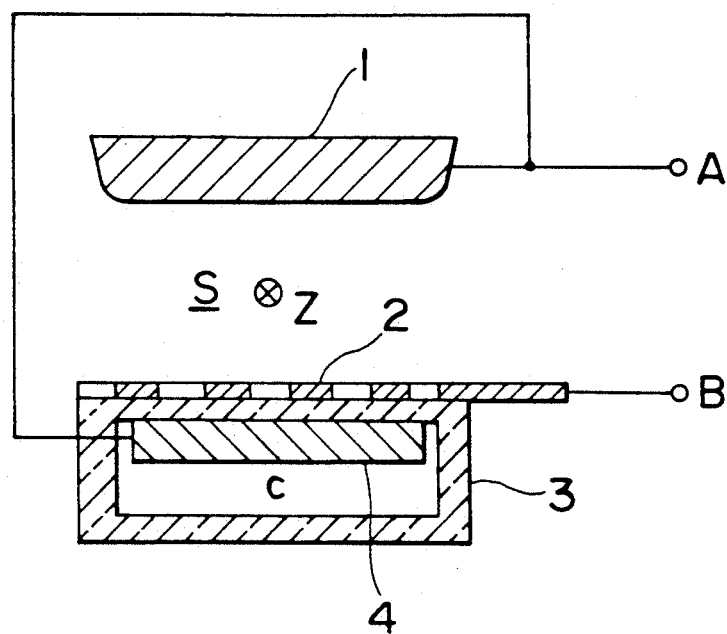
FIGS. 1 to 4 show embodiments of the present invention.
Figure 2:
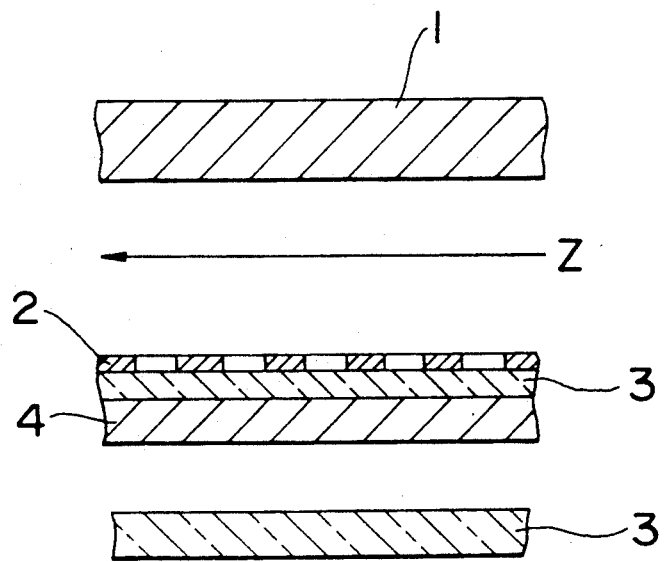

In FIGS. 1 and 2, character Z indicates the optical axis direction of laser beam. A pair of main discharge electrodes, that is, an anode 1 and a cathode 2 are arranged opposedly to each other over the optical axis. The cathode 2 is in the form of a lattice or comb. A dielectric 3 is arranged opposedly of the cathode 2 and externally of the anode 1 and the cathode 2.

Figure 3:
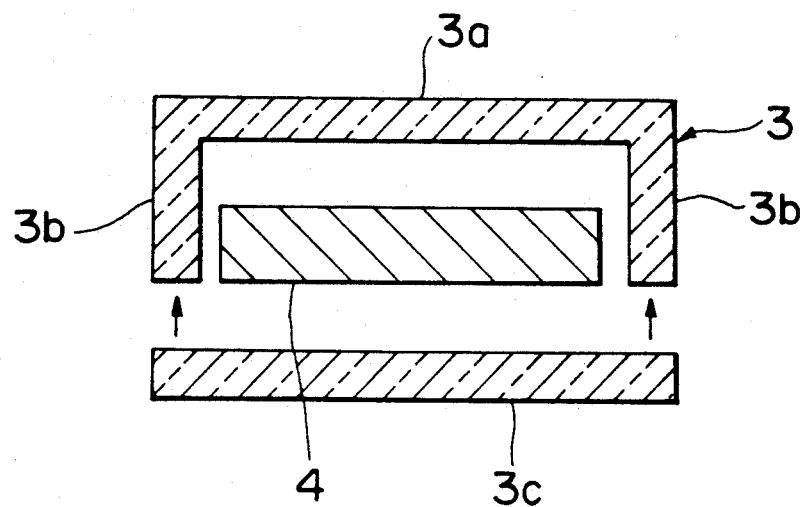

The dielectric 3 is formed of ceramics and, as shown in FIG. 3, formed into a square pipe by joining a rod-like member 3c having a ⊓-shaped section with wall portions 3b extended from opposite sides of a flat plate-like portion 3a opposed to the cathode 2 toward one of the flat plate-like portion 3a, and flat plate-like cover member 3d for covering the open side of the ⊓-shaped rod-like member 3c. Both surfaces of the flat plate-like portion 3a are subjected to mirror surface polishing so that the difference of level between high and low portions is of the order of 5 μm. Preferably, the joining surface of the rod-like member 3a and the cover member 3d is applied with mirror surface working. Thereby it is possible to suppress the deterioration of insulation from the interface.

The cathode 2 is placed in close contact with the outer surface of the flat plate-like portion 3a.

On the other hand, an auxiliary electrode 4 having a flat shape in section is embraced within the dielectric 3 leaving a space C in a manner such that the electrode 4 is opposed to the cathode 2 and has the flat plate-like portion 3a sandwiched therebetween. This auxiliary electrode 4 is along with and in close contact with the inner surface of the flat plate-like portion 3a.

In FIG. 1, character A designates an electrode terminal connected to the anode 1 and the auxiliary electrode 4, and character B designates an electrode terminal connected to the cathode 2.

Next, the laser generating operation in the aforementioned construction of apparatus will be described.

When a pulse-like voltage which is high voltage and short pulse, for example, approximately 30 kv and about 100 nsec, is applied to the electrode terminals A and B, a portion between the cathode 2 and the auxiliary electrode 4 functions as a condenser at riser portion of said pulse to generate an auxiliary discharge. This auxiliary discharge is a corona discharge generated in an opening of the cathode 2 via the dielectric 3. At that time, in the construction of the present embodiments, the contact between the cathode 2 and auxiliary electrode 4 and the dielectric 3 as above-mentioned is good and the capacity of a condenser formed from the cathode 2, the dielectric 3 and the auxiliary electrode 4 is enhanced, and therefore a large corona discharge current flows (FIG. 4, a–b).

A large quantity of electrons are supplied to the main discharge space S by the photo-ionization effect caused by ultraviolet light generated from the auxiliary discharge (corona discharge) and the effect in which electrons from the discharge are moved to the main discharge space S via the cathode 2 (preliminary ionization).

Figure 4:
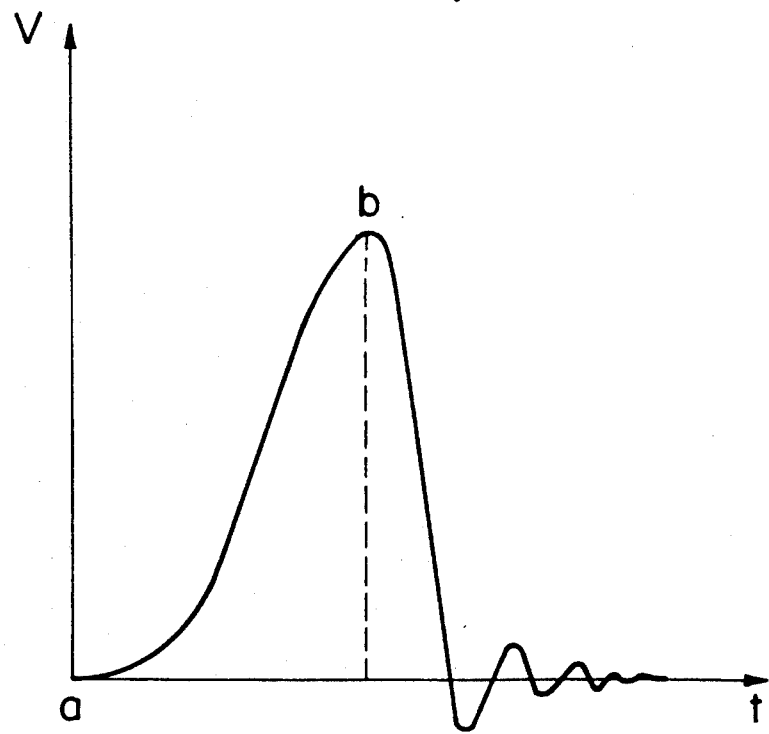

Next, when the pulse voltage applied between the electrode terminals A and B further rises, the main discharge starts (FIG. 4, point b). At this time, the laser gas supplied to the main discharge space S is excited, and the laser beam is oscillated in the Z direction in FIG. 1. The FIG. 4 (point b) is 15 to 30 kv.

In case of KrF excimer laser device, the laser gas used comprises a mixture of He, Ne, Kr and $F_2$ in a predetermined ratio. By altering the kinds of the laser gas, the oscillation waveform of the laser beam can be changed. In the present embodiments, XeCl, ArF excimer laser and so on in addition to the KrF excimer laser can be used.

In the embodiment wherein a square pipe-like dielectric is constituted by a rod-like member having a ⊓-shaped section with wall portions extended from opposite sides of a flat plate-like portion toward one of the flat plate-like portion and a flat plate-like cover member for covering the open side of said rod-like member, an input energy of 4.8 J and an output energy of 140 mJ are obtained and the oscillation was carried out with high efficiency of 3%.

INDUSTRIAL APPLICABILITY

According to the present invention, there is provided a discharge exciting excimer laser device in which a dielectric is formed to be cylindrical and the side thereof opposed to the main discharge electrodes is in the form of a flat plate-like portion, and a auxiliary electrode is embraced within the dielectric leaving a space and opposed to one of the main discharge electrodes. With this arrangement, the preliminary ionization electron density can be increased to enhance the output of the laser beam and improve the insulating performance. Accordingly, the device is suitable for uses which require a high output.

The excimer laser device of the present invention can be used, for example, for a light source for a lithography, fine working of various materials (including boring working and surface modification of various materials), a laser anneal and the like.

We claim:

1. A discharge exciting excimer laser device comprising
    a pair of main discharge electrodes with a laser optical axis being in a longitudinal direction, said main discharge electrodes being arranged opposedly to each other over said laser optical axis,
    a dielectric arranged externally of said pair of main discharge electrodes and opposedly to one of said main discharge electrodes, and
    an auxiliary electrode opposed to said one of said main discharge electrodes through said dielectric;
    wherein a side of said dielectric which is opposed to said one of said main discharge electrodes is in the form of a flat plate,
    said auxiliary electrode being surrounded by said dielectric leaving a space and being opposed to said one of said main discharge electrodes with said side of said dielectric in the form of a flat plate sandwiched therebetween, and
    at least one surface of said side of said dielectric in the form of a flat plate having been subjected to mirror surface polishing so that a difference of altitude in unevenness of said surface is 100 μm or less, said one of said main discharge electrodes or said auxiliary electrode being placed in close contact with said surface.

2. A discharge exciting excimer laser device according to claim 1, wherein said dielectric comprises
    a rod-like member having a ⊓-shaped cross section with a pair of wall portions extended from opposite ends of said side in the form of a flat plate to form an open side and a flat plate cover member for covering said open side of said rod-like member to form a square pipe configuration.

3. A discharge exciting excimer laser device according to claim 1, wherein said surface polishing has been applied so that a difference of altitude in unevenness of said surface is 10 μm or less.

4. A discharge exciting excimer laser device according to claim 2, wherein said surface polishing has been applied so that a difference of altitude in unevenness of said surface is 10 μm or less.

5. A discharge exciting excimer laser device according to any one of claims 1, 2, 3 and 4, wherein said dielectric comprises a ceramic.

6. A discharge exciting excimer laser device according to claim 2, wherein a joining surface of said rod-like member and said cover member has been subjected to mirror surface polishing so that a difference of altitude in unevenness of said surface is 100 μm or less.

* * * * *